US008863039B2

(12) United States Patent
Lim et al.

(10) Patent No.: US 8,863,039 B2
(45) Date of Patent: Oct. 14, 2014

(54) MULTI-DIMENSIONAL BOUNDARY EFFECTS

(75) Inventors: Yu-Xi Lim, Lynnwood, WA (US); Philomena Lobo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 13/089,252

(22) Filed: Apr. 18, 2011

(65) Prior Publication Data
US 2012/0266109 A1 Oct. 18, 2012

(51) Int. Cl.
G06F 3/033 (2013.01)
G06F 3/048 (2013.01)
G06F 3/14 (2006.01)
G06F 3/0488 (2013.01)
G06F 3/0485 (2013.01)

(52) U.S. Cl.
CPC ................................ *G06F 3/04883* (2013.01); *G06F 3/0485* (2013.01)
USPC ............................ 715/863; 715/788; 715/864

(58) Field of Classification Search
USPC ......... 715/863, 864, 711, 788, 798, 815, 818, 715/819, 820, 828, 829
See application file for complete search history.

(56) References Cited

U.S. PATENT DOCUMENTS

| | | | |
|---|---|---|---|
| 5,581,670 A | 12/1996 | Bier et al. | |
| 5,860,073 A | 1/1999 | Ferrel et al. | |
| 5,874,961 A | 2/1999 | Bates et al. | |
| 6,028,593 A | 2/2000 | Rosenberg | |
| 6,157,381 A | 12/2000 | Bates et al. | |
| 6,246,406 B1 | 6/2001 | Nielsen et al. | |
| 6,366,302 B1 | 4/2002 | Crosby | |
| 6,469,718 B1 | 10/2002 | Setogawa et al. | |
| 6,714,213 B1 | 3/2004 | Lithicum | |
| 6,985,149 B2 | 1/2006 | Peercy et al. | |
| 7,032,181 B1 | 4/2006 | Farcasiu | |
| 7,203,901 B2 | 4/2007 | Chen | |
| 7,337,392 B2 | 2/2008 | Lue | |
| 7,428,709 B2 | 9/2008 | Forstall et al. | |
| 7,430,712 B2 | 9/2008 | Arokiaswamy | |

(Continued)

FOREIGN PATENT DOCUMENTS

| | | |
|---|---|---|
| KR | 10-0400208 | 12/2003 |
| WO | WO 2007/017784 | 2/2007 |

OTHER PUBLICATIONS

Kiriati et al., "Introducing Windows® 7 for Developers," 417 pages, Microsoft Press (2010).

(Continued)

*Primary Examiner* — Weilun Lo
*Assistant Examiner* — Truc Chuong
(74) *Attorney, Agent, or Firm* — Bryan Webster; Kate Drakos; Micky Minhas

(57) ABSTRACT

Multi-dimensional boundary effects provide visual feedback to indicate that boundaries in user interface elements (e.g., web pages, documents, images, or other elements that can be navigated in more than one dimension) have been reached or exceeded (e.g., during horizontal scrolling, vertical scrolling, diagonal scrolling, or other types of movement). A compression effect can be displayed to indicate that movement has caused one or more boundaries (e.g., a horizontal boundary and/or a vertical boundary) of a UI element to be exceeded. Exemplary compression effects include compressing content along a vertical axis when a vertical boundary has been exceeded and compressing content along a horizontal axis when a horizontal boundary has been exceeded.

20 Claims, 15 Drawing Sheets

(56) References Cited

U.S. PATENT DOCUMENTS

| | | |
|---|---|---|
| 7,461,353 B2 | 12/2008 | Rohrabaugh |
| 7,469,381 B2 | 12/2008 | Ording |
| 7,634,789 B2 | 12/2009 | Gerba |
| 7,636,755 B2 | 12/2009 | Blattner et al. |
| 7,663,620 B2 | 2/2010 | Robertson et al. |
| 7,690,997 B2 | 4/2010 | Van Luchene et al. |
| 7,698,654 B2 | 4/2010 | Fong et al. |
| 7,698,658 B2 | 4/2010 | Ohwa et al. |
| 7,707,494 B2 | 4/2010 | Ohta |
| 7,724,242 B2 | 5/2010 | Hillis et al. |
| 7,735,004 B2 | 6/2010 | Kobashi et al. |
| 7,779,360 B1 | 8/2010 | Jones et al. |
| 7,958,456 B2 | 6/2011 | Ording |
| 8,113,951 B2 | 2/2012 | David et al. |
| 8,127,246 B2 | 2/2012 | Furches et al. |
| 8,223,134 B1 | 7/2012 | Forstall et al. |
| 2002/0135602 A1 | 9/2002 | Davis et al. |
| 2003/0095135 A1 | 5/2003 | Kaasila |
| 2005/0149551 A1 | 7/2005 | Fong et al. |
| 2006/0053048 A1 | 3/2006 | Tandetnik |
| 2006/0095360 A1 | 5/2006 | Apple et al. |
| 2006/0143577 A1 | 6/2006 | Hsieh et al. |
| 2006/0161863 A1 | 7/2006 | Gallo |
| 2006/0174214 A1 | 8/2006 | McKee et al. |
| 2006/0210958 A1 | 9/2006 | Rimas-Ribikauskas |
| 2006/0277469 A1 | 12/2006 | Chaudhri et al. |
| 2007/0079246 A1 | 4/2007 | Morillon et al. |
| 2007/0132789 A1 | 6/2007 | Ording |
| 2007/0150830 A1 | 6/2007 | Ording et al. |
| 2007/0188444 A1 | 8/2007 | Vale et al. |
| 2007/0245260 A1 | 10/2007 | Koppert |
| 2008/0016471 A1 | 1/2008 | Park |
| 2008/0165210 A1 | 7/2008 | Platzer |
| 2008/0168349 A1 | 7/2008 | Lamiraux et al. |
| 2008/0178126 A1 | 7/2008 | Beeck |
| 2008/0215995 A1 | 9/2008 | Wolf |
| 2008/0307361 A1 | 12/2008 | Louch |
| 2009/0007017 A1 | 1/2009 | Anzures et al. |
| 2009/0070711 A1 | 3/2009 | Kwak |
| 2009/0073194 A1 | 3/2009 | Ording |
| 2009/0125824 A1 | 5/2009 | Andrews et al. |
| 2009/0125836 A1 | 5/2009 | Yamamoto et al. |
| 2009/0138815 A1 | 5/2009 | Mercer |
| 2009/0204928 A1 | 8/2009 | Kallio et al. |
| 2009/0231271 A1 | 9/2009 | Heubel |
| 2009/0284478 A1 | 11/2009 | De la Torre Baltierra et al. |
| 2009/0292989 A1 | 11/2009 | Matthews et al. |
| 2009/0315839 A1 | 12/2009 | Wilson et al. |
| 2009/0327938 A1 | 12/2009 | Faraday et al. |
| 2010/0009747 A1 | 1/2010 | Reville et al. |
| 2010/0011316 A1 | 1/2010 | Sar |
| 2010/0026698 A1 | 2/2010 | Reville et al. |
| 2010/0039447 A1 | 2/2010 | Nakao |
| 2010/0073380 A1 | 3/2010 | Kaplan et al. |
| 2010/0083165 A1 | 4/2010 | Andrews et al. |
| 2010/0107068 A1 | 4/2010 | Butcher et al. |
| 2010/0134425 A1 | 6/2010 | Storrusten |
| 2010/0137031 A1 | 6/2010 | Griffin et al. |
| 2010/0175027 A1 | 7/2010 | Young et al. |
| 2011/0022985 A1 | 1/2011 | Ording et al. |
| 2011/0055752 A1 | 3/2011 | Rubinstein et al. |
| 2011/0078597 A1* | 3/2011 | Rapp et al. ............... 715/765 |
| 2011/0080351 A1 | 4/2011 | Wikkerink et al. |
| 2011/0090255 A1 | 4/2011 | Wilson et al. |
| 2011/0093812 A1 | 4/2011 | Fong |
| 2011/0107264 A1 | 5/2011 | Akella |
| 2011/0181527 A1* | 7/2011 | Capela et al. .............. 715/863 |
| 2011/0199318 A1 | 8/2011 | Fong et al. |
| 2011/0202834 A1 | 8/2011 | Mandryk et al. |
| 2011/0202859 A1 | 8/2011 | Fong |
| 2011/0231782 A1* | 9/2011 | Rohrabaugh et al. ......... 715/760 |

OTHER PUBLICATIONS

McCracken, "Windows 7 Review," <http://www.pcworld.com/printable/article/id,172602/printable.html>, 6 pages. (Oct. 19, 2009).

Coyier, "Scroll/Follow Sidebar, Multiple Techniques," 4 pp. (Nov. 30, 2009).

Jeff Dion, "Creating a Floating HTML Menu Using jQuery and CSS," <http://net.tutsplus.com/html-css-techniques/creating-a-floating-html-menu-using-jquery-and-css/>, 8 pp. (Jun. 2008).

Baudisch et al., "Fishnet, a fisheye web browser with search term popouts: a comparative evaluation with overview and linear view," AVI 2004: Advanced Visual Interfaces Int'l Working Conference, Gallipolli, Italy, May 2004, pp. 133-140.

Cerney and Vance, "Gesture Recognition in Virtual Environments: A Review and Framework for Future Development," Iowa State University Human Computer Interaction Technical Report ISU-HCI-2005-01, Mar. 28, 2005, 25 pages.

Fasig, "Windows 7: Inside Multitouch," PCMag.com, dated Oct. 26, 2009, visited Apr. 15, 2010, 4 pages.

"iPhone How to: Lists," www.apple.com, visited Apr. 15, 2010, 1 page.

"iPhone How to: Scrolling," www.apple.com, visited Apr. 15, 2010, 1 page.

"iPhone How to: Viewing in Landscape," www.apple.com, visited Apr. 15, 2010, 1 page.

"iPhone How to: Zooming In or Out," www.apple.com, visited Apr. 15, 2010, 1 page.

"iPod touch Technology," www.apple.com, visited Apr. 15, 2010, 3 pages.

Kratz and Ballagas, "Gesture Recognition Using Motion Estimation on Mobile Phones," 3rd Int'l Workshop on Pervasive Mobile Interaction Devices (PERMID 2007), May 13, 2007, 5 pages.

Moussa, "Combining Expert Neural Networks Using Reinforcement Feedback for Learning Primitive Grasping Behavior," *IEEE Transactions on Neural Networks*, vol. 15, No. 3, May 3, 2004, pp. 629-638, 10 pages.

Niezen and Hancke, "Gesture Recognition as Ubiquitous Input for Mobile Phones," UbiComp '08 Workshop WI— Devices that Alter Perception (DAP 2008), Sep. 21, 2008, 5 pages.

Siena, "iPhone and the Dog Ears User Experience Model," http://headrush.typepad.com/creating_passionate_users/2007/01/iphone_and_the_.html, 10 pp. (Jan. 2007).

Weinberg, "Exclusive: Windows Mobile 7 to Focus on Touch and Motion Gestures," http://www.etenblog.com/2008/01/09/windows-mobile-7-to-focus-on-touch-and-motion-gestures/, 38 pp. (Jan. 2008).

"Windows Phone 7 Series Features Video," http://www.youtube.com/watch?v=7IOTrq1z4jo, 2 pp. (Feb. 12, 2010).

"Windows Phone 7 Series Demo," http://www.youtube.com/watch?v=MdDAeyy1H0A, 2 pp. (Feb. 12, 2010).

Young, "All About Touch in Windows Media Center in Windows 7," Windows Media Center Team Blog, dated Sep. 15, 2009, visited Apr. 15, 2010, 6 pages.

"Zune HD Is Real, Has Multitouch Web Browsing, OLED Screen and HD Video," gizmodo.com, dated May 26, 2009, visited Apr. 15, 2010, 3 pages.

Office action from U.S. Appl. No. 12/773,803, dated Feb. 15, 2013, 25 pages.

Final Office action from U.S. Appl. No. 12/773,803, dated Sep. 5, 2013, 20 pages.

Office action from U.S. Appl. No. 12/721,419, dated Jun. 10, 2013, 25 pages.

Final Office action from U.S. Appl. No. 12/721,418, dated Feb. 14, 2014, 22 pages.

* cited by examiner

FIG. 1
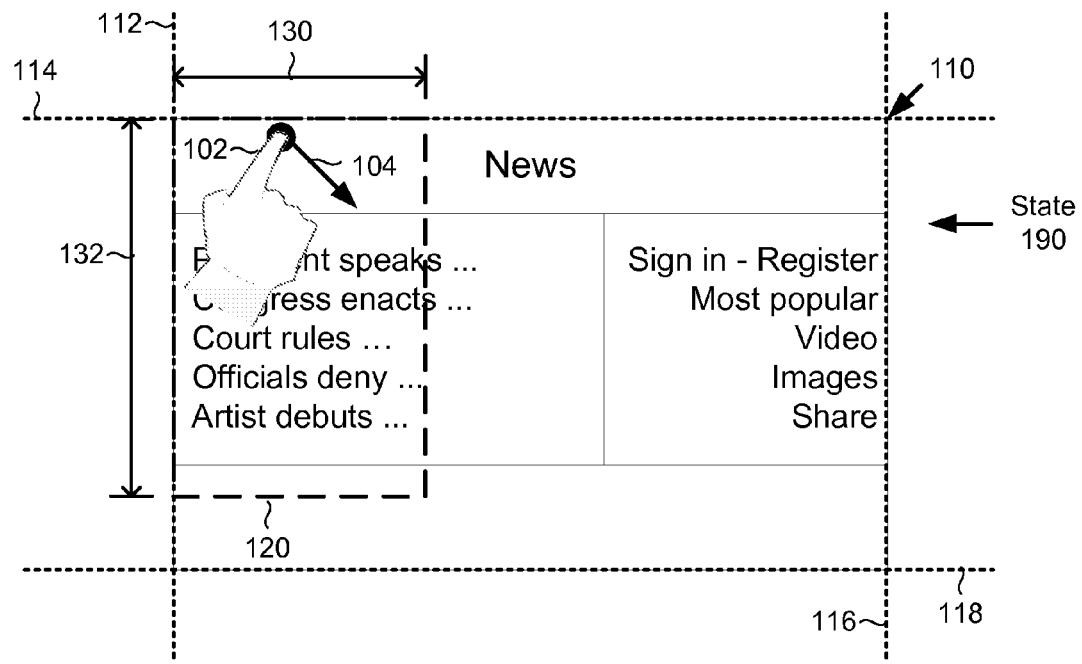
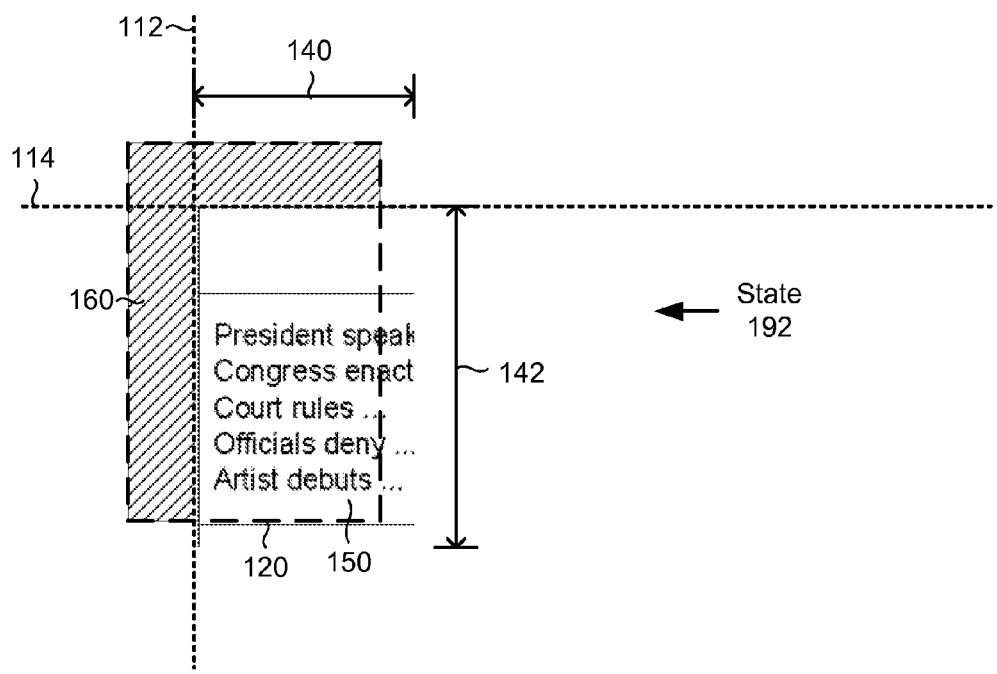

FIG. 8

800 {
If position_current < position_min
    position_delta = position_min − position_current
Else if position > position_max
    position_delta = position − position_max region_to_be_compressed = size_of_viewport + compression_percent *
                         (position_max − position_min) +
                         compression_offset compression_scale = (region_to_be_compressed − position_delta) /
                    region_to_be_compressed
}

FIG. 9

900 {
compressed_size = (size_of_viewport * compression_scale) + compression_offset If position_current > position_max
  Center = position_max - compressed_size Else if position_current < position_min
  Center = position_min + compressed_size
}

FIG. 10

1000 {
If component_position_current > component_position_max
　　component_position_current = component_position_max
　　component_velocity = 0

If component_position_current < component_position_min
　　component_position_current = component_position_min
　　component_velocity = 0
}

FIG. 11

$$1100 \begin{cases} \text{If component\_position\_current > component\_position\_max +} \\ \qquad\qquad\qquad\qquad \text{component\_compression\_limit} \\ \qquad \text{component\_position\_current = component\_position\_max +} \\ \qquad\qquad\qquad\qquad \text{component\_compression\_limit} \\ \qquad \text{component\_velocity = 0} \\ \\ \text{If component\_position\_current < component\_position\_min -} \\ \qquad\qquad\qquad\qquad \text{component\_compression\_limit} \\ \qquad \text{component\_position\_current = component\_position\_min -} \\ \qquad\qquad\qquad\qquad \text{component\_compression\_limit} \\ \qquad \text{component\_velocity = 0} \end{cases}$$

FIG. 12

```
At each time step:
    If (net_velocity > net_maximum_speed)
        Factor = net_velocity / net_maximum_speed
        Component_velocity_x = component_velocity_x / Factor
        Component_velocity_y = component_velocity_y / Factor For each component
        If (in bounds)
            new_component_velocity = component_velocity *
                                    (drag_coefficient ^ time_delta)
            new_component_position = component_position +
                                    (new_component_velocity * time_delta)
            component_velocity = new_component_velocity
            component_position = new_component_position
        Else
            If (component_position > component_position_max)
                Target = component_position_max
                Sign = -1
            Else
                Target = component_position_min
                Sign = 1
            position_delta = abs(component_position - Target)
            Fs = spring_factor * position_delta ^ spring_factor
            new_delta = max(0, position_delta - Fs * (1 - damper_factor) *
                            time_delta)
            delta_velocity = Fs * damper_factor + new_delta / time_delta
            new_component_velocity = (component_velocity +
                                    (Sign * delta_velocity)) *
                                    (drag_coefficient ^ time_delta)
            new_component_position = Target - (Sign * new_delta) +
                                    (new_component_velocity * time_delta)

If (abs(new_component_position – Target) = 0) or
               (component_position < Target and new_component_position >
                Target) or
               (component_position > target and new_component_position <
                Target)
                    component_velocity = 0
                    component_position = Target
            Else
                component_velocity = new_component_velocity
                component_position = new_component_position If (net_velocity < parking_speed) and (both components are in bounds)
        component_velocity_x = component_velocity_y = 0
```

1200

Software 1380 implementing described technology

MULTI-DIMENSIONAL BOUNDARY EFFECTS

BACKGROUND

The design of an effective user interface poses many challenges. One challenge is how to provide a user with an optimal amount of visual information or functionality, given the space limitations of a display and the needs of a particular user. This challenge can be especially acute for devices with small displays, such as smartphones or other mobile computing devices. This is because there is often more information available to a user performing a particular activity (e.g., browsing a web page) than can fit on the display.

Whatever the benefits of previous techniques, they do not have the advantages of the techniques and tools presented below.

SUMMARY

Disclosed herein are representative embodiments of methods, apparatus, and systems for generating multi-dimensional boundary effects. The disclosed methods, apparatus, and systems should not be construed as limiting in any way. Instead, the present disclosure is directed toward all novel and non-obvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any specific advantage be present or problem be solved.

In examples described herein, multi-dimensional boundary effects can provide visual feedback to indicate that boundaries in user interface (UI) elements (e.g., web pages, documents, images, or other UI elements that can be navigated in more than one dimension) have been reached or exceeded (e.g., during horizontal scrolling, vertical scrolling, diagonal scrolling, or other types of movement). For example, a compression effect can be displayed to indicate that movement in a graphical user interface (GUI) has caused one or more boundaries (e.g., a horizontal boundary and/or a vertical boundary) of a UI element to be exceeded. Exemplary compression effects include compressing content along a vertical axis when a vertical boundary has been exceeded and compressing content along a horizontal axis when a horizontal boundary has been exceeded.

The foregoing and other objects, features, and advantages will become more apparent from the following detailed description, which proceeds with reference to the accompanying figures.

BRIEF DESCRIPTION OF THE DRAWINGS

FIG. 1 is a diagram showing multi-dimensional boundary effects in a graphical user interface, according to one or more described embodiments.

FIG. 8, FIG. 9, FIG. 10, FIG. 11, FIG. 12 are code diagrams showing pseudocode for performing calculations relating to multi-dimensional boundary effects, according to one or more described embodiments.

DETAILED DESCRIPTION

Figure 2:
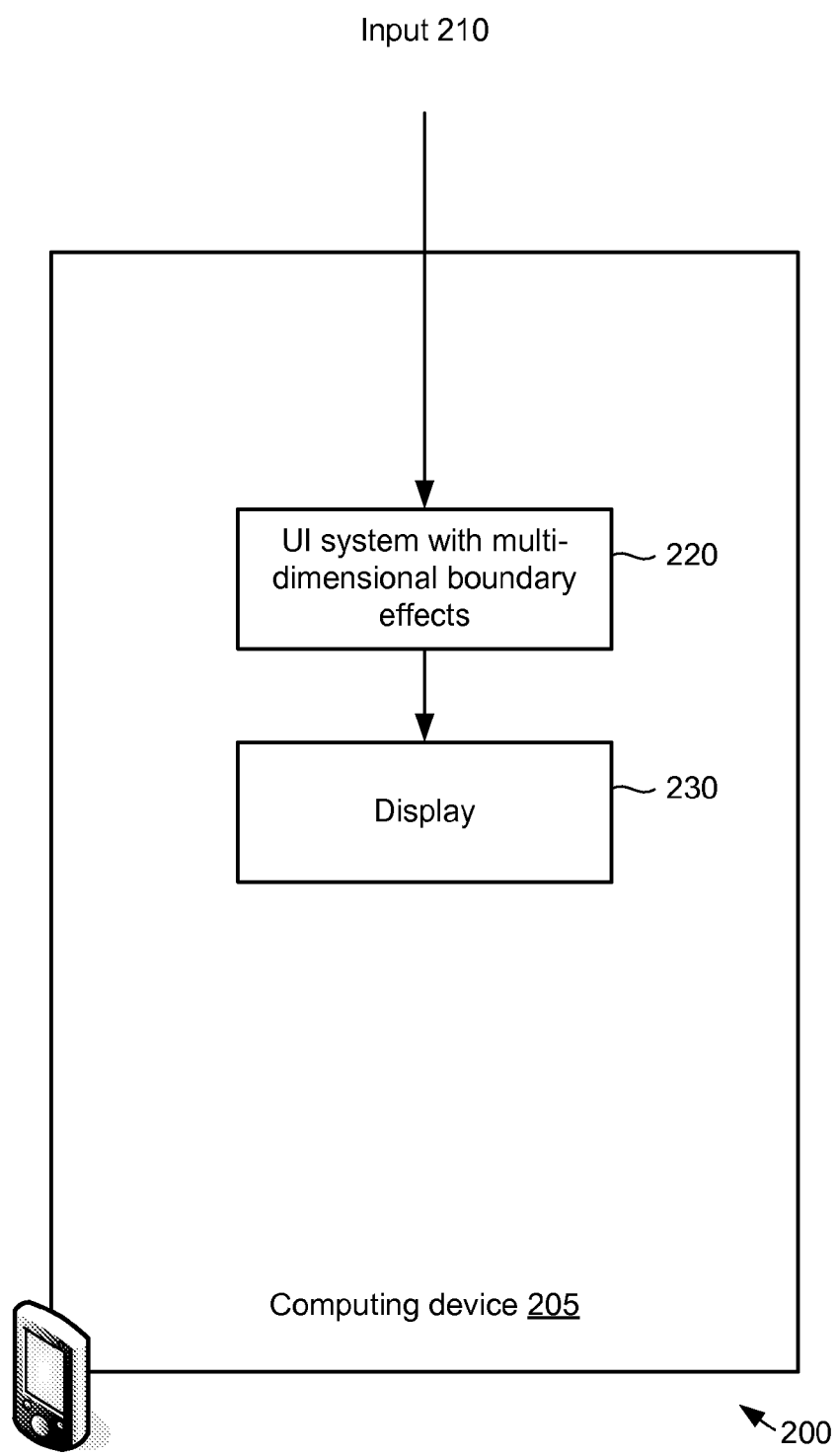
FIG. 2 is a block diagram showing a system in which described embodiments can be implemented.

Disclosed herein are representative embodiments of methods, apparatus, and systems for presenting multi-dimensional boundary effects in a user interface. Exemplary multi-dimensional boundary effects include compression effects, in which content is presented in a visually compressed or squeezed state to indicate that a boundary has been exceeded.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems.

The disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer or image processor embedded in a device, such as a laptop computer, desktop computer, net book, web book, tablet computing device, smart phone, or other mobile computing device). Any of the intermediate or final data created and used during implementation of the disclosed methods or systems can also be stored on one or more computer-readable media (e.g., non-transitory computer-readable media).

For clarity, only certain selected aspects of the software-based embodiments are described. Other details that are well known in the art are omitted. For example, it should be understood that the software-based embodiments are not limited to any specific computer language or program. Likewise, embodiments of the disclosed technology are not limited to any particular computer or type of hardware. Exemplary computing environments suitable for performing any of the disclosed software-based methods are introduced below.

The disclosed methods can also be implemented using specialized computing hardware that is configured to perform any of the disclosed methods. For example, the disclosed methods can be implemented by an integrated circuit (e.g., an application specific integrated circuit (ASIC), a graphics processing unit (GPU), or programmable logic device (PLD), such as a field programmable gate array (FPGA)) specially designed to implement any of the disclosed methods (e.g., dedicated hardware configured to perform any of the disclosed techniques).

I. Overview

The feel of a user interface (UI) is becoming increasingly important to distinguish the underlying product from its competitors. An important contributor to the feel of a UI is how it reacts when a user interacts with it. This is especially true for touch-based interfaces. For example, many mobile phones allow a user to use touch input to control movement of UI elements such as web pages (e.g., to scroll horizontally and/or vertically to view content on the web page).

Accordingly, techniques and tools are described for providing visual feedback in the form of multi-dimensional boundary effects for UI elements that are capable of moving in more than one dimension (e.g., vertically and horizontally). Some multi-dimensional boundary effects can be referred to as "compression effects" or "accordion effects" to describe a visual compression or squeeze effect that is applied to content to indicate, in a visually distinctive way, that one or more boundaries (e.g., horizontal boundaries, vertical boundaries) have been reached or exceeded. For example, if a user is scrolling down to the end of content on a web page, a UI system can present a boundary effect to indicate that a vertical boundary of the web page has been reached, and if the user is scrolling to the right, the UI system can present a boundary effect to indicate that a horizontal boundary of the web page has been reached. As another example, boundary effects for horizontal and vertical boundaries can be presented at the same time (e.g., in response to diagonal movement).

Movements in examples described herein can be responsive to user interaction. For example, a user that wishes to navigate from one part of a UI element to another (e.g., from one part of a web page to another) provides user input to indicate a desired movement. In some embodiments, a user causes movement in a display area of a device by interacting with a touchscreen. The interaction can include, for example, a gesture that involves contacting the touchscreen with a fingertip, stylus or other object and moving it (e.g., with a flicking or sweeping motion) across the surface of the touchscreen to cause movement in a desired direction. Alternatively, a user can interact with a UI in some other way, such as by pressing buttons (e.g., directional buttons) on a keypad or keyboard, moving a trackball, pointing and clicking with a mouse, making a voice command, etc.

The actual amount and direction of the user's motion that can produce particular movements in the UI can vary depending on implementation or user preferences. For example, a UI system can include a default setting that is used to calculate the amount of motion (e.g., in terms of pixels) as a function of the size (e.g., linear distance) and/or velocity of a gesture. As another example, a user can adjust a touchscreen sensitivity control, such that the same gesture will produce smaller or larger movements in the UI, depending on the setting of the control. Gestures can be made in various directions to cause movement in the UI. For example, upward and downward gestures can cause upward or downward movements, respectively, while rightward and leftward movements can cause rightward and leftward movements, respectively. Diagonal gestures can cause diagonal movements, or diagonal gestures can be interpreted to cause vertical or horizontal movements (e.g., depending on whether the diagonal gesture is closer to a vertical gesture or a horizontal gesture, or depending on directions of motion that are permitted in the UI element). Other kinds of motion, such as non-linear motion (e.g., curves) or bi-directional motion (e.g., pinch or stretch motions made with multiple contact points on a touchscreen) also can be used to cause movement.

In some embodiments, movements in a UI are based at least in part on user input (e.g., gestures on a touchscreen) and an inertia model. For example, a movement can be extended beyond the actual size of a gesture on a touchscreen by applying inertia to the movement. Applying inertia to a movement typically involves performing one more calculations using gesture information (e.g., a gesture start position, a gesture end position, gesture velocity and/or other information) and one or more inertia motion values (e.g., friction coefficients) to simulate inertia motion. Simulated inertia motion can be used in combination with other effects (e.g., boundary effects) to provide feedback to a user.

In any of the examples herein, movements, boundary effects, and other changes in the state of a UI can be rendered for display.

II. Multi-Dimensional Boundary Effects

In examples described herein, boundary effects can be used to provide visual cues to a user to indicate that a boundary (e.g., a horizontal boundary, a vertical boundary, or other boundary) in a UI element (e.g., a web page displayed in a browser) has been reached or exceeded. In described implementations, a UI system presents multi-dimensional boundary effects in a UI element (or a portion of a UI element) by causing the UI element to be displayed in a visually distorted state, such as a squeezed or compressed state (i.e., a state in which text, images or other content is shown to be smaller than normal in one or more dimensions), to indicate that one or more boundaries of the UI element have been exceeded. As used herein, "multi-dimensional boundary effect" refers to a boundary effect in a UI element that is capable of moving in more than one dimension. Multi-dimensional movement can be performed separately in different dimensions (e.g., horizontal scrolling followed by vertical scrolling) or in combination (e.g., diagonal movement). Multi-dimensional boundary effects need not include boundary effects presented for more than one boundary at the same time, although in some embodiments boundary effects can be presented for more than one boundary at the same time. For example, in some embodiments, diagonal movement that causes a vertical boundary and a horizontal boundary of a UI element to be exceeded can cause compression of content in the UI element along a horizontal axis and along a vertical axis at the same time.

Boundary effects (e.g., compression effects) can be presented in different ways. For example, a boundary effect can be displayed for different lengths of time depending on user input and/or design choice. A boundary effect can end, for example, by returning the UI element to a normal (e.g., undistorted) state when a user lifts a finger, stylus or other object to end an interaction with a touchscreen after reaching a boundary, or when an inertia motion has completed. As another example, boundary effects other than compression effects can be used.

FIG. 1 is a diagram showing aspects of a graphical user interface (GUI) presented by a UI system that uses multi-dimensional boundary effects to indicate that boundaries of a UI element (web page 110, in this example) have been exceeded. According to the example shown in FIG. 1, a user 102 (represented by the hand icon) interacts with a touchscreen by making a diagonal drag gesture 104. The direction of the drag gesture is indicated by the arrow pointing down and to the right. The interaction can include, for example, contacting the touchscreen with a fingertip, stylus or other object and moving it (e.g., with a flicking or sweeping motion) along the surface of the touchscreen.

From state 190, the diagonal drag gesture 104 causes movement of the web page 110 within a rectangular viewport 120 (shown within a dashed line), which is smaller than the web page 110. Content in the web page 110 that was within viewport 120 in state 190 is partially outside the viewport 120 in state 192. In this example, the motion of web page 110 comprises finger-tracking motion caused by drag gesture 104, but compression effects also can occur with other motion resulting from other kinds of gestures, such as inertia motion caused by a flick gesture.

The diagonal drag gesture 104 causes multi-dimensional boundary effects in state 192. For example, the diagonal drag gesture 104 causes a compression effect shown in state 192. A compression effect can indicate that one or more boundaries have been exceeded. For example, a compression effect can involve compressing (or scaling) visual content according to a horizontal scale factor to indicate that a horizontal boundary has been exceeded, and compressing visual content according to a vertical scale factor to indicate that a vertical boundary has been exceeded. In the example shown in state 192, the compression effect indicates that a left boundary 112 and top boundary 114 of the web page 110 have been exceeded. The web page 110 also includes a right boundary 116 and a bottom boundary 118, which have not been exceeded in state 192. A boundary can be deemed exceeded or not exceeded based on, for example, whether a viewport position value (e.g., an x-coordinate value or a y-coordinate value) is outside a range defined by boundaries of the web page 110 (e.g., an x-coordinate range defined by left boundary 112 and right boundary 116, or a y-coordinate range defined by top boundary 114 and bottom boundary 118).

The compression effect in FIG. 1 is indicated by compressed dimension lines 140, 142 indicating dimensions of a compressed area 150. In compressed area 150, a portion of the web page 110 has been squeezed or compressed in a vertical dimension, as shown by the reduced length of the compressed dimension line 142 in state 190 as compared to the uncompressed dimension line 132 in state 190. The compressed area 150 of the web page 110 also has been squeezed or compressed in a horizontal dimension, as shown by the reduced length of the compressed dimension line 140 in state 192 as compared to the uncompressed dimension line 130 in state 190. From state 192, the web page 110 can return to the uncompressed state shown in state 190. For example, the web page 110 can return to the uncompressed state after the gesture 104 shown in state 190 is ended (e.g., when the user breaks contact with the touchscreen).

As another example, the diagonal drag gesture 104 causes a background area 160 to be shown in the viewport 120 adjacent to the compressed area 150. The background area 160 is distinguishable from other content in the web page 110, and can indicate that one or more boundaries in the web page 110 have been exceeded. In the example shown in state 192, the background area 160 is visible above and to the left of the compressed area 150, indicating that a vertical boundary and a horizontal boundary have been exceeded. The background area 160 can be, for example, a different pattern, shade, or color than the compressed area 150, or can be otherwise distinguishable (e.g., by an outline or other visual indicator) from content in the web page 110. The background area 160 can be presented as a Out color area that uses a background color specified by the source code (e.g., HTML source code) of the web page. A background area 160 that takes on a background color specified by the web page may be distinguishable to a greater or lesser extent depending on the similarity between the specified background color and other content in the web page 110.

Although FIG. 1 shows user 102 interacting with the touchscreen at a particular location with respect to web page 110, the UI system allows interaction with other parts of the touchscreen to cause movement and/or boundary effects. Furthermore, although the example shown in FIG. 1 shows user 102 making a diagonal gesture 104, user 102 also can make other gestures (e.g., downward gestures, horizontal gestures, curved gestures), or combinations of gestures. Different gestures can cause different boundary effects, different display states, different transitions between display states, etc.

States 190 and 192 are only examples of possible states. In practice, a UI element (e.g., web page 110) can exist in any number of states in addition to, or as alternatives to, the example states 190 and 192. For example, it is preferable to show a gradual transition from an uncompressed state (e.g., state 190) to a compressed state (e.g., state 192), or from a compressed state to an uncompressed state, to provide a more natural feel and avoid the appearance of abrupt changes in the display. Intermediate states, such as states that may occur between state 190 and state 192, can show gradually increasing or decreasing degrees of compression effects or other boundary effects, as appropriate.

Although the example shown in FIG. 1 is described in terms of movement of a UI element relative to a viewport, any of the examples described herein also can be modeled in terms of movement of viewports relative to UI elements, or in some other way, depending on the desired frame of reference.

A. Exemplary System

FIG. 2 is a block diagram of an exemplary system 200 implementing technologies described herein. In the example, a computing device 205 (e.g., a smart phone or other mobile computing device) implements a UI system 220 that presents multi-dimensional boundary effects.

In the example shown in FIG. 2, computing device 205 receives input 210. Input 210 can include touch input (e.g., input from one or more gestures on a touchscreen or other touch input device). Input 210 can be processed in the UI system 220 to determine whether multi-dimensional boundary effects are to be presented on display 230. For example UI system 220 can analyze input 210 to determine whether a gesture on a touchscreen has caused a UI element to exceed a movement boundary. UI system 220 can then calculate multi-dimensional boundary effects (e.g., compression effects) to provide feedback to a user and indicate that one or more boundaries have been exceeded. The multi-dimensional boundary effects can then be rendered for display.

In practice, the systems described herein such as system 200 can include additional system components, additional relationships between system components, and the like. For example, the system 200 can include an operating system running on computing device 205 that comprises UI system 220. The relationships shown between components within the system 100 indicate general flows of information in the system; other relationships are not shown for the sake of simplicity. Depending on the implementation and the type of processing desired, components of the system can be added, omitted, split into multiple components, combined with other components, and/or replaced with like components. Generally, the technologies described herein are generic to different operating systems or hardware and can be applied in any variety of environments to take advantage of the described features.

B. Exemplary Techniques

Figure 3:
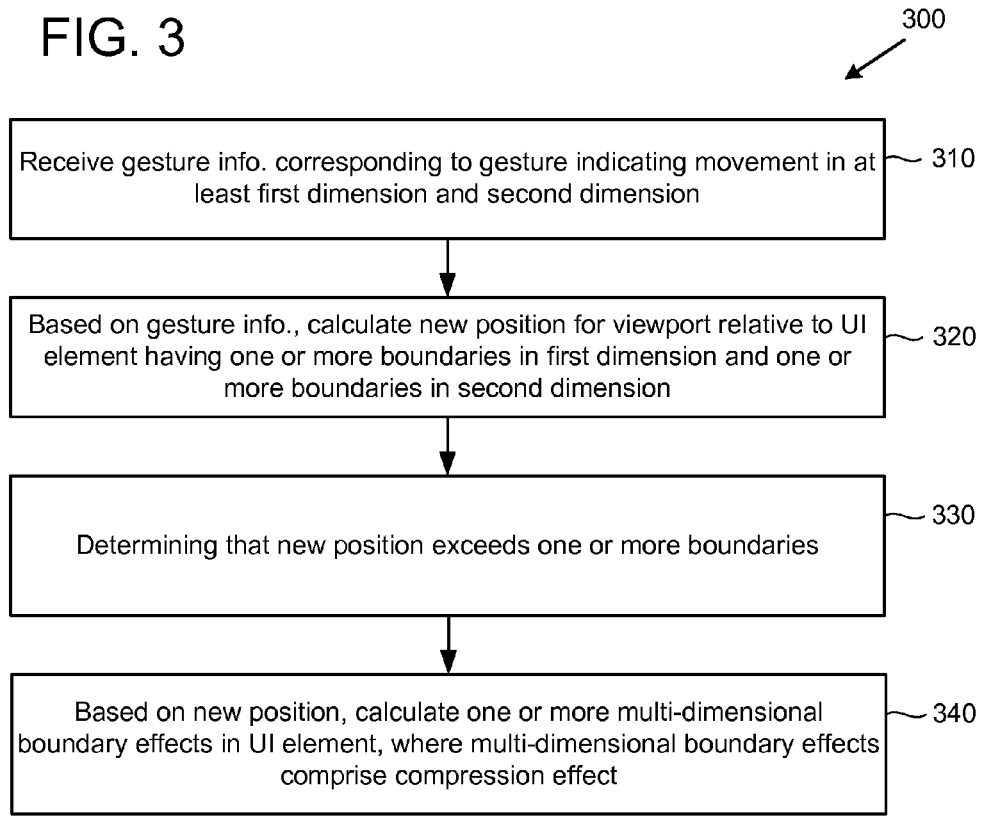
FIG. 3, FIG. 4 and FIG. 5 are flow charts showing exemplary multi-dimensional boundary effect techniques, according to one or more described embodiments.

FIG. 3 shows an exemplary technique 300 for calculating multi-dimensional boundary effects that can be rendered for display. A system such as the system 200 shown in FIG. 2 or other system performs the technique 300.

At 310, the system receives gesture information corresponding to a gesture indicating movement in at least a first dimension and a second dimension (e.g., a vertical dimension and a horizontal dimension). At 320, the system calculates, based on the gesture information, a new position for a viewport relative to a UI element (e.g., a web page). The UI element has one or more boundaries in the first dimension and one or more boundaries in the second dimension. For example, the UI element can have top and bottom boundaries in a vertical dimension, and left and right boundaries in a horizontal dimension. Gesture information can include, for example, a velocity, a displacement, and a direction. Velocity can be measured in terms of component velocities (e.g., a velocity along the x-axis and a velocity along the y-axis), which can be combined to determine a net velocity. Gesture information also can be used to calculate simulated inertia motion. For example, simulated inertia motion can be applied when a gesture has a velocity above a threshold velocity. The new position can be further based on the simulated inertia motion. At 330, the system determines that the new position for the viewport exceeds one or more of the boundaries. At 340, the system calculates one or more multi-dimensional boundary effects based at least in part on the new position of the viewport. The multi-dimensional boundary effects comprise a compression effect. For example, the system can determine an extent by which a boundary has been exceeded, determine a region of the UI element to be compressed, and determine a scale factor for the compression effect based on the size of the region to be compressed and the extent by which the boundary has been exceeded. The region to be compressed can then be scaled according to the scale factor to produce a compression effect. Besides compression effects, the system can present other multi-dimensional boundary effects, such as by displaying a visually distinctive background area adjacent to a compressed area.

Figure 4:
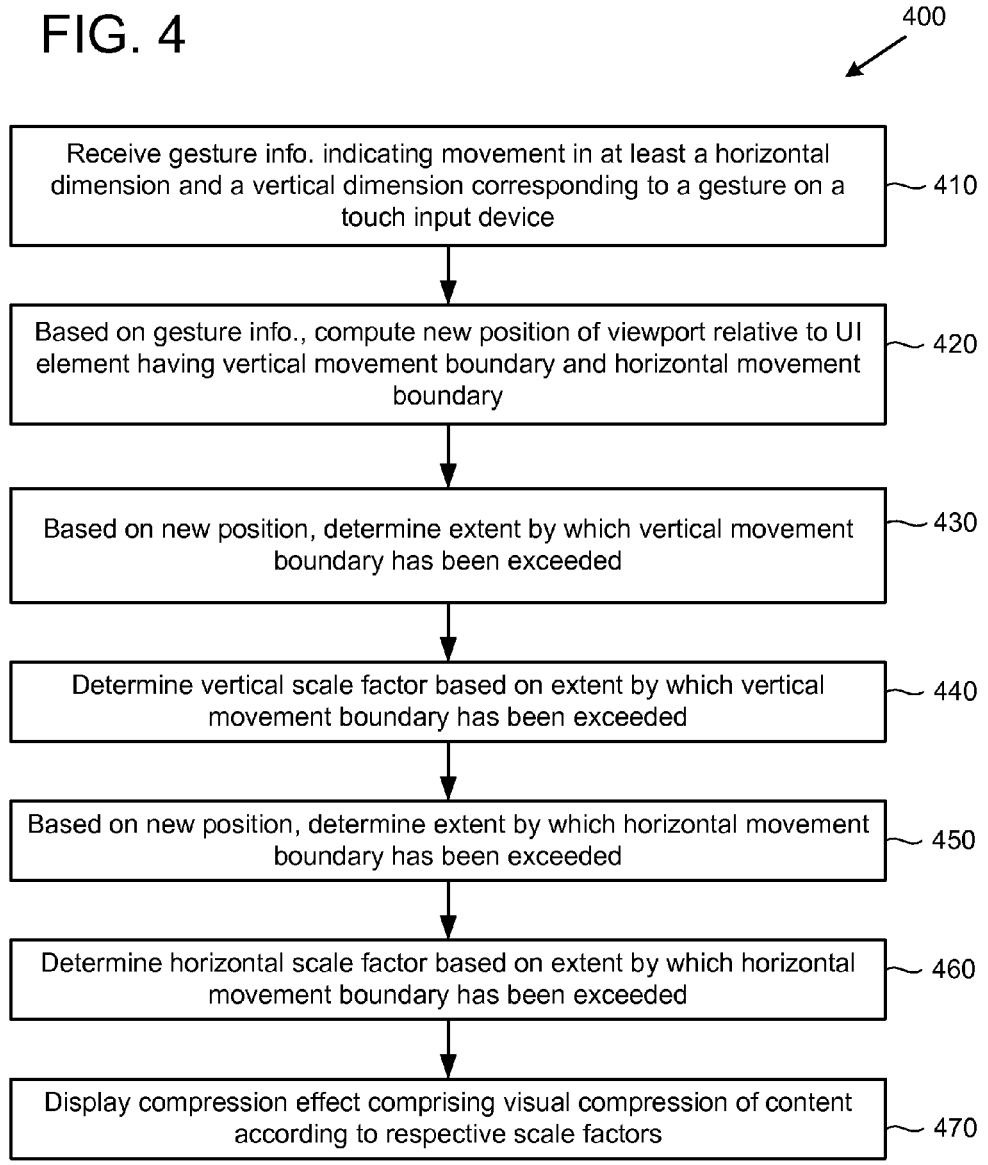

FIG. 4 shows an exemplary technique 400 for presenting a compression effect according to horizontal and vertical scale factors. A system such as the system 200 shown in FIG. 2 or other system performs the technique 400.

At 410, the system receives gesture information corresponding to a gesture on a touch input device. The gesture information indicates movement in at least a horizontal dimension and a vertical dimension. At 420, the system computes a new position of a viewport relative to a UI element in a GUI based at least in part on the gesture information. The UI element has a vertical movement boundary and a horizontal movement boundary. At 430, the system determines an extent by which the vertical movement boundary has been exceeded based at least in part on the new position. At 440, the system determines a vertical scale factor based at least in part on the extent by which the vertical movement boundary has been exceeded. At 450, the system determines an extent by which the horizontal movement boundary has been exceeded based at least in part on the new position. At 460, the system determines a horizontal scale factor based at least in part on the extent by which the horizontal movement boundary has been exceeded. At 470, the system displays a compression effect in the GUI. The compression effect comprises a visual compression of content in the GUI according to the respective scale factors. The horizontal scale factor can differ from the vertical scale factor. The scale factors can be further based on the size of a region to be compressed, which can be based on the size of the viewport.

Figure 5:
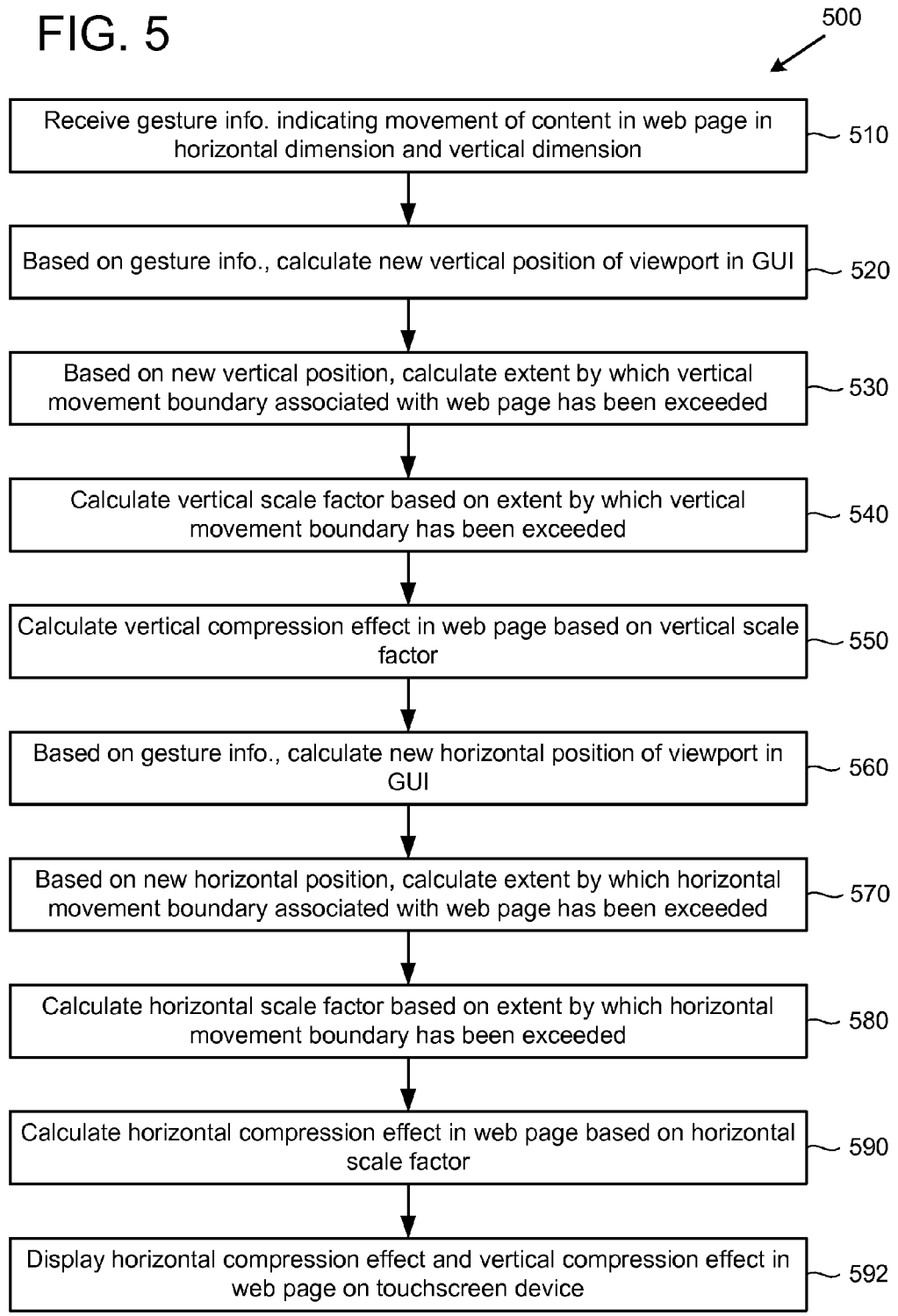

FIG. 5 shows an exemplary technique 500 for calculating compression effects on a web page and displaying them on a touchscreen device. For example, steps 520-592 in FIG. 5 can be repeated for each frame in a set of frames in a multi-dimensional boundary effect animation. A system such as the system 200 shown in FIG. 2 or other system performs the technique 500.

At 510, the system receives gesture information corresponding to a gesture on a touchscreen device. The gesture information indicates a movement of content in a web page in at least a horizontal dimension and a vertical dimension in a GUI. At 520, the system calculates a new vertical position of a viewport in the GUI based at least in part on the gesture information. At 530, the system calculates an extent by which a vertical movement boundary associated with the web page has been exceeded, based at least in part on the new vertical position. At 540, the system calculates a vertical scale factor based at least in part on the extent by which the vertical movement boundary has been exceeded. At 550, the system calculates a vertical compression effect in the web page based at least in part on the vertical scale factor. At 560, the system calculates a new horizontal position of the viewport based at least in part on the gesture information. At 570, the system calculates an extent by which a horizontal movement boundary associated with the web page has been exceeded. At 580, the system calculates a horizontal scale factor based at least in part on the extent by which the horizontal movement boundary has been exceeded. At 590, the system, calculates a horizontal compression effect in the web page based at least in part on the horizontal scale factor. At 592, the system displays the horizontal compression effect and the vertical compression effect in the web page on the touchscreen device.

In any of the above techniques, any combination of the effects described herein can be applied. Depending on implementation and the type of processing desired, processing stages shown in example techniques can be rearranged, added, omitted, split into multiple stages, combined with other stages, and/or replaced with like stages.

For example, a UI system also can determine (e.g., based on characteristics of a current UI element) whether boundary effects are not available for UI elements with boundaries in only one dimension (e.g., only a vertical boundary or only a horizontal boundary), and skip processing stages that are not relevant.

III. Detailed Example

In this section, a detailed example is described comprising aspects of motion feedback, including boundary effects, which can be presented in response to gestures or other input.

In this detailed example, boundary effects for UI elements are applied in the context of a viewport that scrolls in two dimensions (e.g., a viewport that displays a portion of a web page, document, or other content) and relies on a physical model that include representations of simulated inertia, momentum, elasticity, and friction. Some boundary effects for UI elements in this detailed example can be presented as animations that embody animation principles squash, follow-through, and exaggeration) to give a user a sense of physicality of the viewport and the content.

For example, the content in a UI element can be modeled in an animation as an elastic surface (e.g., a rectangular elastic surface) moving within a larger rectangular region that represents the extent of the scrollable region for the viewport. When a boundary is exceeded, the boundary can appear in the viewport and the elastic surface can be compressed. During compression of the elastic surface, the content can be compressed along the axis corresponding to a boundary that was exceeded.

For compression effects, the length of time that boundaries appear in the viewport and that the elastic surface is compressed can vary depending on motion type. For example, during inertial motion of the elastic surface (e.g., motion following a flick gesture), one or more boundaries of the elastic surface can appear briefly in the viewport and then move back out of the viewport (e.g., in a non-linear fashion as dictated by equations in a physics engine). As another example, if a user performing a drag gesture maintains contact with the touchscreen, one or more boundaries of the elastic surface can appear in the viewport indefinitely with the elastic surface in a compressed state, until the user breaks contact with the touchscreen.

Boundary effect animations can be applied to any boundary of a UI element, and can be combined with other animations. For example, an animation of a boundary effect can be combined with an animation of inertial scrolling movement. Other boundary effects can include showing a background color that differs from content in a UI element, to illustrate one or more boundaries of the UI element.

The viewport represents the area of the content and/or scrollable region that can be viewed at one time in a display area. However, the actual fraction of the content and/or the scrollable region that can be viewed in the viewport can depend, for example, on whether a user has selected a zoomed-in or a zoomed-out view, and the degree of the zoom.

The movement of the content relative to the viewport can depend on the gesture that causes the movement. In a finger-tracking gesture, such as a drag gesture, the content can track movement of a user's finger. For example, the content can scroll horizontally, vertically, or diagonally in response to horizontal, vertical, or diagonal movement, respectively, of the user's finger. The content also can exhibit inertial movement (e.g., movement after a user's finger breaks contact with the touchscreen) in response to some gestures (e.g., flick gestures).

If multiple boundaries are exceeded, the compression animation can be applied only along one corresponding axis or along more than one axis. For example, in a compression animation that follows a diagonal movement in which a horizontal boundary and a vertical boundary are exceeded, compression can be applied along only the vertical axis, only the horizontal axis, or along both axes. Compression applied along both axes can be animated such that the compression effect along each axis ends at the same time, or at different times. For example, if horizontal displacement is less than vertical displacement, a compression along the horizontal axis can end earlier than compression along the vertical axis. Alternatively, a compression can end along both axes at the same time regardless of the relative displacement in each dimension.

Applying a compression effect along only one axis while maintaining a normal scale on the other axis can be useful, for example, to provide a greater visual effect where scaling along both axes (e.g., according to the same scale factor) would only make the content look smaller. If a compression effect is applied along only one axis, the UI element can react to a boundary on another axis with a "hard stop" in which motion along that axis ceases at the boundary, with a bounce effect, or with some other reaction. A determination of how compression is to be applied can be made dynamically (e.g., based on whether the diagonal movement is nearer to a vertical movement or a horizontal movement) or based on predetermined settings (e.g., user preferences). For example, a setting can indicate that a compression effect is to be applied along both axes whenever two boundaries are exceeded, to maintain a consistent appearance. As another example, if a UI element is being viewed at a zoom level where the entire length or width of the UI element is visible in the viewport, the UI element can be treated such that a corresponding boundary cannot be exceeded. Thus, where the entire width of a web page is visible in the viewport, the system can omit horizontal scrolling and prevent horizontal boundaries from being exceeded by movement in the web page content.

Figure 6:
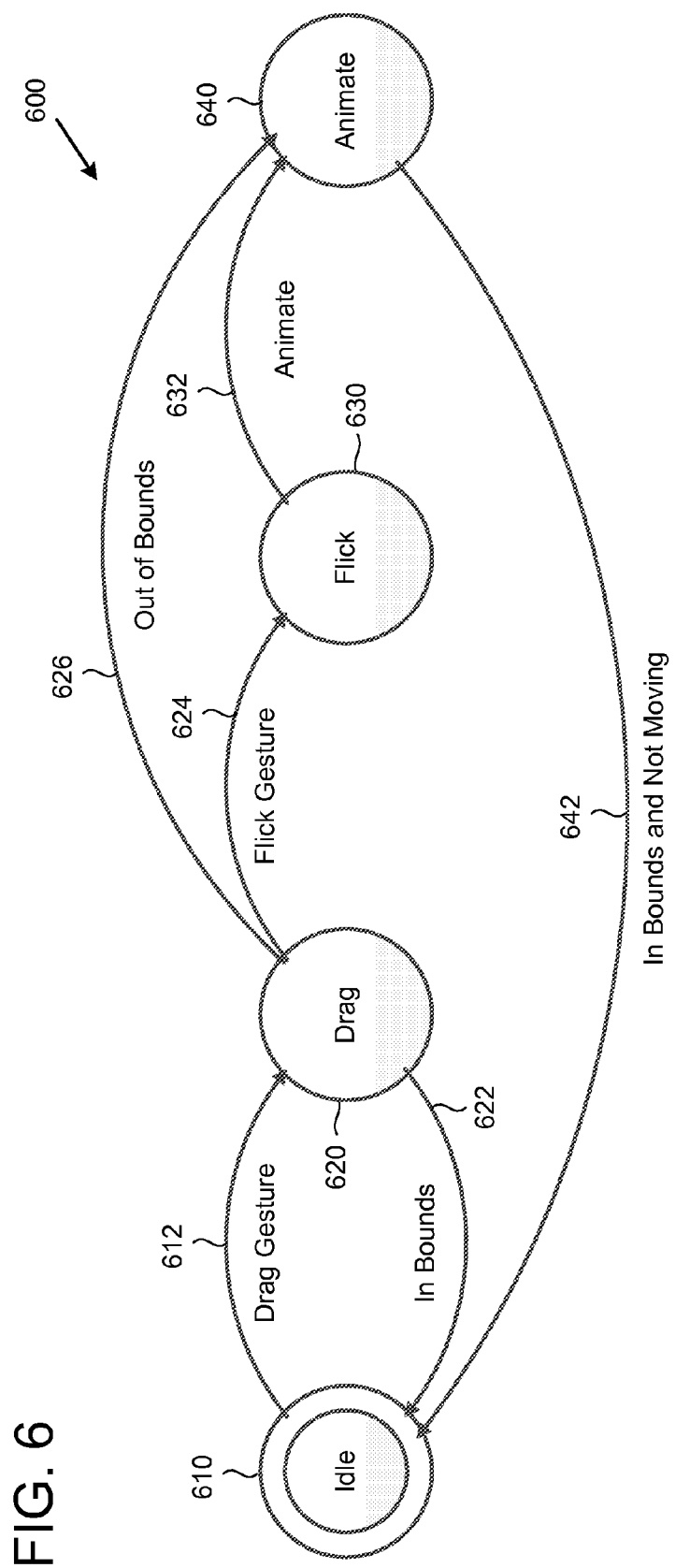
FIG. 6 is a state diagram that describes behavior of a user interface system that presents boundary effects, according to one or more described embodiments.

FIG. 6 shows a state diagram 600 depicting exemplary behavior in an exemplary system that presents two-dimensional boundary effects in a UI element (e.g., a web page). A system such as the system 200 in FIG. 2 or some other system can exhibit behavior depicted in the state diagram 600.

In the example shown in FIG. 6, from start state 610 ("Idle"), when the system detects a drag gesture (e.g., based on touch input received via a touchscreen), state transition 612 ("Drag Gesture") takes the system to state 620 ("Drag"). The drag gesture causes movement in a UI element, relative to a viewport. The state that occurs after state 620 depends on what happens next. For example, if the viewport is positioned within the boundaries of the UI element after movement caused by the drag gesture is complete, state transition 622 ("In Bounds") takes the system back to state 610 ("Idle"). As another example, if the system receives gesture information that indicates a flick gesture, state transition 624 ("Flick Gesture") takes the system from state 620 to state 630 ("Flick"). Although flick gestures are detected after an initial detection of a drag gesture in the example shown in FIG. 6, the system can detect flick gestures in other ways. For example, the system can be configured to be able to enter state 630 ("Flick") directly from start state 610.

From state 630, the system can transition to state 640 ("Animate") via state transition 632 ("Animate"). In state 640 ("Animate"), the system presents one or more animations (e.g., boundary effect animations, inertial motion animations). For example, the system can animate inertial motion caused by the flick gesture in the UI element in state 640. As another example, if the flick gesture causes the UI element to be moved beyond one or more boundaries, the system can animate one or more boundary effects in state 640. As another example, if a drag gesture causes the UI element to be moved beyond one or more boundaries, state transition 626 ("Out of Bounds") takes the system to state 640 if the system detects that the viewport is positioned beyond one or more boundaries of the UI element as a result of movement caused by the drag gesture.

Animation of movement can be performed, for example, at a system frame rate (e.g., 60 frames per second (fps)) or using an internal timer (e.g., at a minimum value such as 10 fps to ensure good performance and accurate calculations). A physics engine can perform stepped calculations at each frame. Whatever time step is used between frames, a new view of the UI can be drawn at each frame. The view that is drawn can depend on several factors, including whether one or more boundaries in a UI element have been exceeded. For example, if the viewport is out of bounds, a physics engine can determine compression effect information (e.g., a compression point and a compressed size for the content in the UI element being compressed), and the UI system can draw a view of the UI using the compression effect information. If the viewport is not out of bounds, the UI system can draw a view of the UI without a compression effect.

From state 640, state transition 642 ("In Bounds and Not Moving") takes the system back to state 610 ("Idle") after animations (e.g., inertial motion animations, boundary effect animations) have completed. In the example shown in FIG. 6, state transition 642 indicates that the system leaves state 640 when the viewport is within the boundaries of the UI element, and the UI element has stopped moving. Alternatively, the system can leave state 640 when some other set of conditions is present. For example, a system could enter an idle state where the viewport remains outside one or more boundaries of the UI element. As another alternative, other states and state transitions (e.g., states or state transitions corresponding to other kinds of user input or events) can be used in the system.

A. Exemplary Parameters and Constants for Physics Engine

In this detailed example, a physics engine is used to determine movement of UI elements (e.g., web pages or documents) in the UI. A system such as the system 200 in FIG. 2 or some other system can implement a physics engine as described in this detailed example.

A single physical gesture made by a user can be composed of several gesture events, as interpreted by the system. For example, a user can contact the touchscreen and drag her finger across the surface for a period of time, ending with a flick of her finger as she breaks contact with the touchscreen. A system can interpret this physical gesture as the following series of gesture events: <contact down>, <drag>, <drag>, <drag>, <contact up>, <flick>. The physics engine can be configured more than once during a single physical gesture. For example, input parameters can be determined on the first drag event and again on the flick event.

In this detailed example, at the start of a gesture (e.g., a drag gesture or a flick gesture), the physics engine can take current parameters as input and perform calculations that can be rendered as movement in the UI. Parameters used by the physics engine in this detailed example include size parameters, position parameters, and velocity parameters. Size parameters include the size (e.g., in the horizontal (x) and vertical (y) dimensions) of the viewport. Position parameters (e.g., in the horizontal (x) and vertical (y) dimensions) include position_current, position_min, position_max. In this detailed example, position_current is a viewport value that represents a point (e.g., a midpoint) between the edges of the viewport. position_min and position_max are boundary values that represent boundaries in a UI element which, if exceeded by position_current, can cause the system to present boundary effects to indicate that a boundary in a UI element has been exceeded. As used herein, the term "exceed" is used to describe a value that is outside a range defined by boundaries. For example, a viewport value can be considered to exceed a boundary if the viewport value is less than position_min or greater than position_max.

Constants used by the physics engine in this detailed example include a resistance coefficient (drag_coefficient), a parking speed (parking_speed), a net maximum speed (net_maximum_speed), a spring factor (spring_factor), a damper factor (damper_factor), compression limits (component_compression_limit), a compression percentage (compression_percentage), and a compression offset (compression_offset). Alternatively, other parameters or constants can be used. As another alternative, values described as constants can be modified or allowed to change dynamically. As another alternative, some values described as parameters can be fixed as constants.

Figure 7:
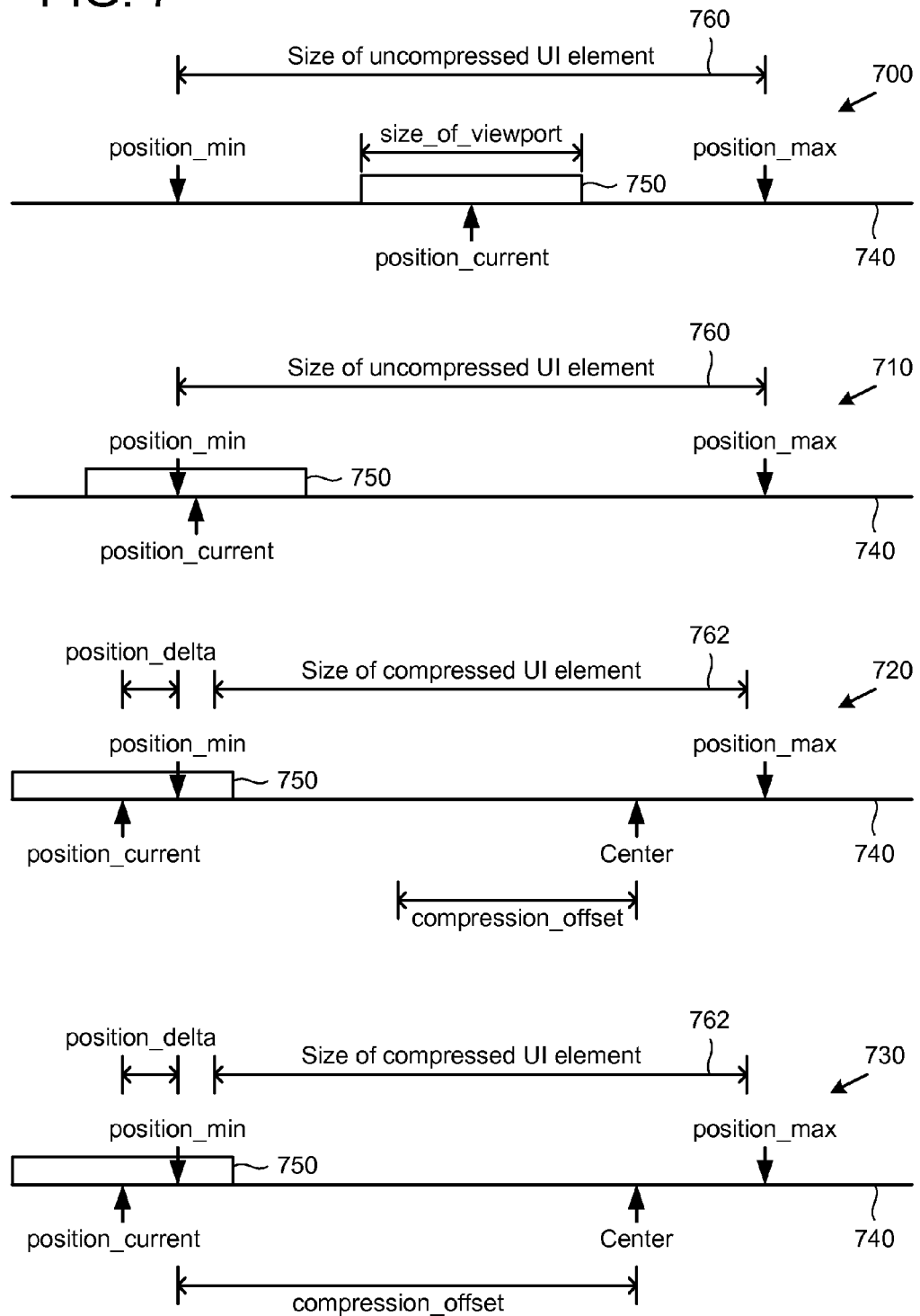
FIG. 7 is a diagram showing parameters relating to multi-dimensional boundary effects, according to one or more described embodiments.

FIG. 7 is a diagram of exemplary arrangements 700, 710, 720, and 730 in which exemplary viewport size and position parameters are shown. In the examples shown in arrangements 700, 710, 720, and 730, parameters for a single dimension (e.g., a horizontal dimension) of a UI element are shown. Similar parameters can be used for other dimensions (e.g., a vertical dimension). A viewport 750 is represented as a rectangle having a size parameter ("size_of_viewport"). In the examples shown in arrangements 700, 710, 720, and 730, the current position of the viewport 750 is represented by the arrow labeled "position_current" at the midpoint of the viewport 750 along axis 740 of a UI element. Alternatively, position_current can be measured from some other point, such as an edge of the viewport 750. The arrows labeled "position_min" and "position_max" represent boundary values along axis 740 within a scrollable region which, if exceeded by position_current, can cause the system to present boundary effects to indicate that a boundary in the UI element has been exceeded. In this detailed implementation, position_current is not dependent on size_of_viewport, and it is possible for an edge of a viewport to extend beyond position_min or position_max without causing the system to present boundary effects. Arrangement 700 depicts an exemplary situation in which a boundary effect can be omitted. In arrangement 700, the value of position_current is within the range defined by position_min and position_max. The size of the uncompressed UI element is shown by dimension line 760. Arrangement 710 depicts another exemplary situation in which a boundary effect can be omitted. In arrangement 710, the edge of viewport 750 extends to the left of position_min, but the value of position_current is still within the range defined by position_min and position_max. Arrangements 720 and 730 depict exemplary situations in which a boundary effect can be presented on a display. In arrangements 720 and 730, the value of position_current is less than position_min. The size of the compressed UI element is shown by dimension line 762. Alternatively, other parameters can be used to determine whether boundary effects are to be presented, or decisions to present boundary effects can be made in some other way. For example, the system can omit boundary effects along a horizontal axis even where position_current indicates that a horizontal boundary has been exceeded, based on settings that indicate that boundary effects should only be applied along a vertical axis.

B. Exemplary Calculations

This section describes exemplary calculations that can be performed (e.g., by a physics engine in a UI system) to present boundary effects for UI elements (e.g., web pages or documents). In this detailed example, a physics engine performs the exemplary calculations described in this section. Although this detailed example refers to movement of viewports relative to UI elements, any of the examples described herein also can be modeled in terms of movement of UI elements relative to viewports, or in some other way, depending on the desired frame of reference.

1. Scale Factors

A physics engine can calculate scale factors for compression effects to be applied along one or more axes in a UI element. In this detailed example, scale factors (compression_scale) can be calculated for each dimension according to the pseudocode 800 shown in FIG. 8. In the example shown in pseudocode 800, compression_offset, compression_percent, position_max, position_min are constants for each axis, region_to_be_compressed represents the area to be compressed, and position_delta represents the distance to the nearest boundary. In the example shown in pseudocode 800, region_to_be_compressed is based on size_of_viewport, plus an amount determined by compression_percent and compression_offset. In the example shown in pseudocode 800, in the horizontal dimension, position_delta represents the distance to the left boundary where position_current is less than position_min (as shown in arrangements 720 and 730 in FIG. 7) or the distance to the right boundary where position_current is greater than position_max. As another example, in the vertical dimension, position_delta represents the distance to the top boundary where position_current is less than position_min or the distance to the bottom boundary where position_current is greater than position_max. In the example shown in pseudocode 800, compression_scale is a fraction that depends on the values of position_delta and region_to_be_compressed, and is calculated as:

(region_to_be_compressed−position_delta)/region_to_be_compressed, which reduces to:

1−(position_delta/region_to_be_compressed).

2. Compression Points

A physics engine can calculate a compression point (also referred to as "Center") that marks a position towards which content is compressed in a multi-dimensional boundary effect. In this detailed example, a physics engine can calculate compression points for each dimension according to the pseudocode 900 shown in FIG. 9. Content at a compression point corresponding to a first axis is not compressed along that first axis, although that same content may be compressed along another axis. For example, horizontal compression can be omitted for content on a line or band centered on a compression point for an x-axis, although some content along that line or band may be compressed vertically, if vertical compression is also being performed. In the example shown in pseudocode 900, compression_offset, position_max, and position_min are constants for each axis, and compressed_size represents the size of the content that was in the viewport after compression. In the example shown in pseudocode 900, compressed_size depends on size_of_viewport, compression_scale, and compression_offset. The compression point for the corresponding dimension is represented by Center in pseudocode 900 and depends on the boundary that has been exceeded. For example, in the horizontal dimension, Center is equal to the difference between position_max and compressed_size where the right boundary has been exceeded (position_current>position_max), and Center is equal to the sum of position_min and compressed_size where the left boundary has been exceeded (position_current<position_min). As another example, in the vertical dimension, Center is equal to the difference between position_max and compressed_size where the bottom boundary has been exceeded (position_current>position_max), and Center is equal to the sum of position_min and compressed_size where the top boundary has been exceeded (position_current<position_min).

Alternatively, Center can be calculated as follows:

Center=size_of_viewport*compression_percent+compression_offset.

The values of constants such as compression_percent and compression_offset can be adjusted to produce different compression effects. In one embodiment, Center is calculated according to the equation above with compression_percent set to a value of 0 and compression_offset set to a value of 1800, such that Center is equal to 1800 regardless of the value of size_of_viewport.

In practice, a compression point can be located at any number of different positions in a UI element. For example, a compression point can be located at or near the center of a UI element. As another example, a compression point can be located at or near a border of UI element. The compression point can vary based on the content of a UI element, the size of a region to be compressed, the size of the viewport, or other criteria. The compression point may be positioned outside the viewport. For a two-dimensional UI element, a compression point can be represented as an origin for a scaling operation, the origin having an x-coordinate and a y-coordinate. In the exemplary arrangements 720 and 730 shown in FIG. 7, the arrows labeled "Center" represent a coordinate (e.g., an x-coordinate or a y-coordinate) for a compression point and are positioned outside the viewport 750 along the axis 740 of the UI element. In arrangement 720, "Center" is calculated based on a smaller value of compression_offset, and is dependent on size_of_viewport. In arrangement 730, "Center" is based on a larger value of compression_offset, and is not dependent on size_of_viewport. Along a horizontal axis, content to the left of the compression point is compressed to the right and content to the right of the compression point is compressed to the left. Along a vertical axis, content below the compression point is compressed up and content above the compression point is compressed down. The size of the compressed UI element in arrangements 720 and 730 is shown by dimension line 762. In embodiments where content is compressed from opposite edges of the UI element towards the compression point, positioning the compression point outside the viewport helps to avoid revealing more content after a boundary has been exceeded than was visible before the boundary was exceeded (e.g., content from below a compression point where a top boundary has been exceeded).

3. Velocity and Position

In this section, exemplary velocity and position calculations are described. In this section, "net" (e.g., net velocity) is used to refer to a resultant combined vector of two component vectors, and "component" (e.g., component position, component velocity) is used to refer to either an x-axis or y-axis component of the respective position or velocity. The exemplary calculations described in this section can be performed by a UI system having a physics engine, or by some other system.

In this detailed example, a physics engine can calculate positions of a viewport relative to UI elements having boundaries which have been reached or exceeded. For example, a UI element can be constrained such that a boundary along a particular axis cannot be exceeded. If a boundary cannot be exceeded, movement that would take the viewport beyond the boundary can be ended (and velocity, if any, can be reduced to zero) with a hard stop at the boundary, as shown in the pseudocode 1000 in FIG. 10. If a boundary can be exceeded, movement that would take the viewport beyond the boundary can be ended (and velocity, if any, can be reduced to zero) with a hard stop at some limit beyond the boundary (component_position_limit), as shown in the pseudocode 1100 in FIG. 11.

More generally, a physics engine can calculate positions and velocities as shown in the pseudocode 1200 in FIG. 12. In the example shown in pseudocode 1200, time_delta represents a length of time since the last time step (e.g., the length of time since the last view of the UI was drawn by the UI system). At each time step in the example shown in pseudocode 1200, the net velocity of the viewport relative to a UI element is checked against a maximum speed (net_maximum_speed) and the component velocities are reduced (while preserving direction) if the net velocity is above the maximum speed. Also at each time step in the example shown in pseudocode 1200, for each axis, if a boundary has not been exceeded, a new velocity and a new position is calculated, taking into account a coefficient that slows the velocity (e.g., drag_coefficient, based on a model of fluid resistance). If a boundary has been exceeded, that boundary is considered to be the "Target" boundary, and "Sign" indicates the direction to move in order to return to the boundary. (If a compression limit also has been reached, motion can be stopped as shown in the pseudocode 1100 in FIG. 11.) The physics engine calculates the distance (position_delta) to the Target boundary. The physics engine uses a spring model to calculate movement that returns the viewport to the Target boundary. The physics engine calculates the force (Fs) of the spring based on a spring factor constant (spring_factor), and uses the force of the spring and a damper factor (damper_factor) to calculate a new distance (new_delta) to the Target boundary. new_delta is non-negative because the spring model does not oscillate around the Target boundary. The physics engine calculates a change in velocity (delta_velocity) for the UI element using the force of the spring and the damper factor, and calculates a new velocity (new_component_velocity) for the component based on the original component velocity, the change in velocity due to the spring, and drag_coefficient. The physics engine calculates a new position for the component (new_component_position) relative to the Target boundary, based on new_delta and new_component_velocity. If new_component_position is at the Target boundary, or if new_component_position is now on the other side of the Target boundary, motion stops and the component position is set to be the same value as the Target boundary.

The physics engine can end movement when the net velocity is less than a parking speed constant (parking_speed). For example, referring again to pseudocode 1200, the physics engine can set component_velocity_x and component_velocity_y to 0 when net_velocity is less than parking_speed and the viewport is within the boundaries of the UI element. Comparing the parking speed constant to the net velocity can be more effective at providing a natural feel to movement in multi-dimensional boundary effects than comparing the parking speed constant to a component velocity (e.g., component_velocity_x or component_velocity_y). For example, a movement caused by a diagonal flick gesture may slow to a stop along one axis before another axis, resulting in a less natural effect, if the physics engine determines whether to stop movement in individual dimensions by comparing a parking speed constant to individual component velocities rather than determining whether to stop movement in both dimensions (e.g., simultaneously) by comparing a parking speed constant to a net velocity.

IV. Exemplary Computing Environment

Figure 13:
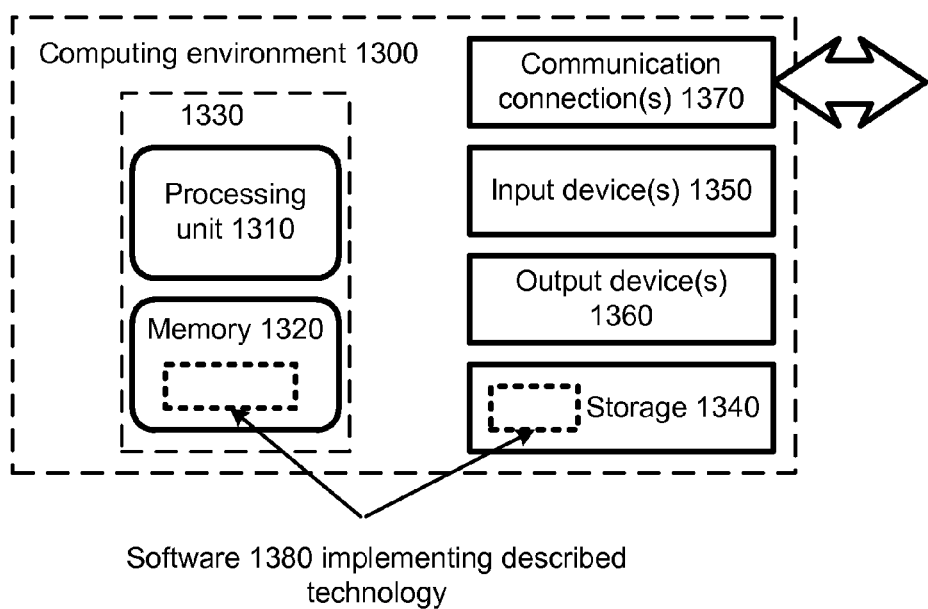
FIG. 13 illustrates a generalized example of a suitable computing environment in which several of the described embodiments may be implemented.

FIG. 13 illustrates a generalized example of a suitable computing environment 1300 in which the described technologies can be implemented. The computing environment 1300 is not intended to suggest any limitation as to scope of use or functionality, as the technologies may be implemented in diverse general-purpose or special-purpose computing environments.

With reference to FIG. 13, the computing environment 1300 includes at least one processing unit 1310 coupled to memory 1320. In FIG. 13, this basic configuration 1330 is included within a dashed line. The processing unit 1310 executes computer-executable instructions. In a multi-processing system, multiple processing units execute computer-executable instructions to increase processing power. The memory 1320 may be non-transitory memory, such as volatile memory (e.g., registers, cache, RAM), non-volatile memory (e.g., ROM, EEPROM, flash memory, etc.), or some combination of the two. The memory 1320 can store software 1380 implementing any of the technologies described herein.

A computing environment may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other non-transitory computer-readable media which can be used to store information and which can be accessed within the computing environment 1300. The storage 1340 can store software 1380 containing instructions for any of the technologies described herein.

The input device(s) 1350 may be a touch input device such as a keyboard, touchscreen, mouse, pen, or trackball, a voice input device, a scanning device, or another device that provides input to the computing environment 1300. The output device(s) 1360 may be a display, printer, speaker, CD- or DVD-writer, or another device that provides output from the computing environment 1300. Some input/output devices, such as a touchscreen, may include both input and output functionality.

The communication connection(s) 1370 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., non-transitory computer-readable storage media or other tangible media). Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., non-transitory computer-readable storage media or other tangible media). Such instructions can cause a computer to perform the method. The technologies described herein can be implemented in a variety of programming languages.

Any of the methods described herein can be implemented by computer-executable instructions stored in one or more non-transitory computer-readable storage devices (e.g., memory, CD-ROM, CD-RW, DVD, or the like). Such instructions can cause a computer to perform the method.

V. Exemplary Implementation Environment

Figure 14:
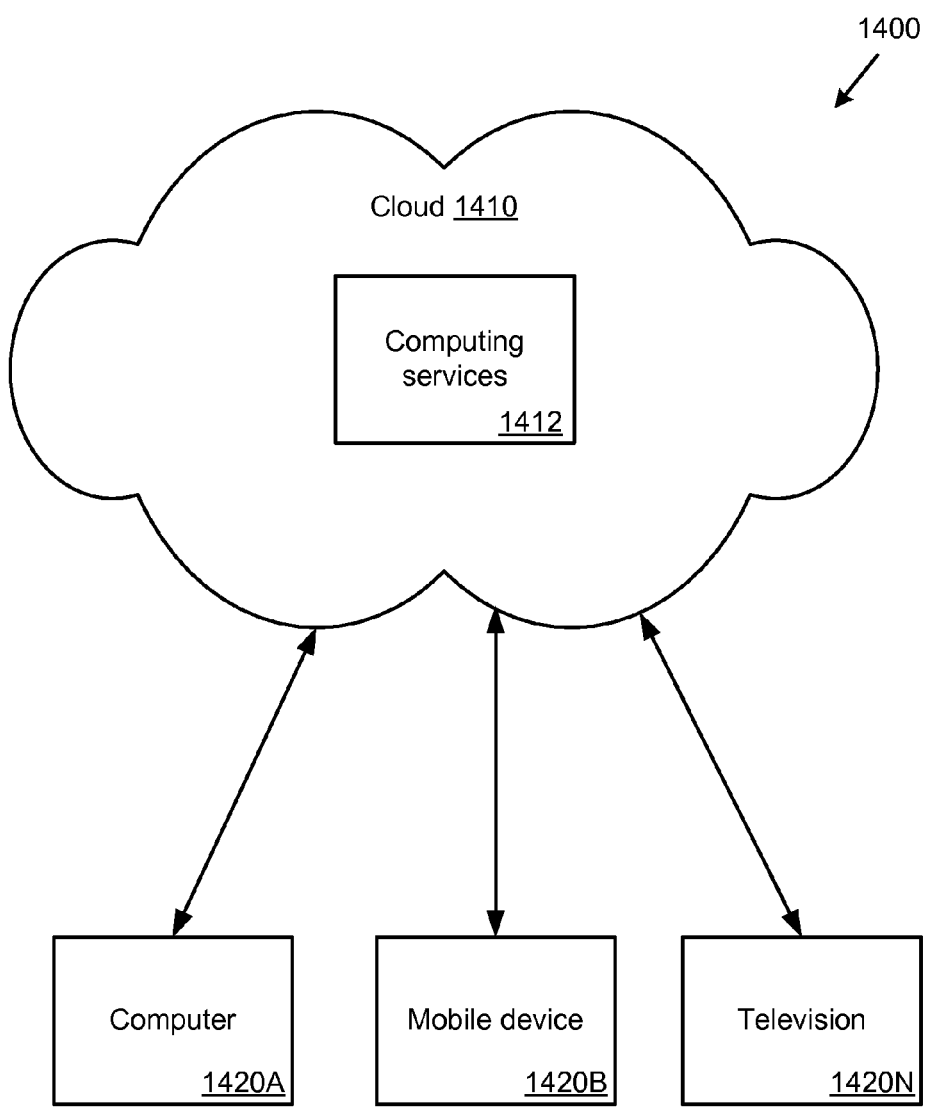
FIG. 14 illustrates a generalized example of a suitable implementation environment in which one or more described embodiments may be implemented.

FIG. 14 illustrates a generalized example of a suitable implementation environment 1400 in which described embodiments, techniques, and technologies may be implemented.

In example environment 1400, various types of services (e.g., computing services 1412, which can include any of the methods described herein) are provided by a cloud 1410. For example, the cloud 1410 can comprise a collection of computing devices, which may be located centrally or distributed, that provide cloud-based services to various types of users and devices connected via a network such as the Internet. The cloud computing environment 1400 can be used in different ways to accomplish computing tasks. For example, with reference to the described techniques and tools, some tasks, such as processing user input and presenting a user interface, can be performed on a local computing device, while other tasks, such as storage of data to be used in subsequent processing, can be performed elsewhere in the cloud.

In example environment 1400, the cloud 1410 provides services for connected devices with a variety of screen capabilities 1420A-N. Connected device 1420A represents a device with a mid-sized screen. For example, connected device 1420A could be a personal computer such as desktop computer, laptop, notebook, netbook, or the like. Connected device 1420B represents a device with a small-sized screen. For example, connected device 1420B could be a mobile phone, smart phone, personal digital assistant, tablet computer, and the like. Connected device 1420N represents a device with a large screen. For example, connected device 1420N could be a television (e.g., a smart television) or another device connected to a television or projector screen (e.g., a set-top box or gaming console).

A variety of services can be provided by the cloud 1410 through one or more service providers (not shown). For example, the cloud 1410 can provide services related to mobile computing to one or more of the various connected devices 1420A-N. Cloud services can be customized to the screen size, display capability, or other functionality of the particular connected device (e.g., connected devices 1420A-N). For example, cloud services can be customized for mobile devices by taking into account the screen size, input devices, and communication bandwidth limitations typically associated with mobile devices.

VI. Exemplary Mobile Device

Figure 15:
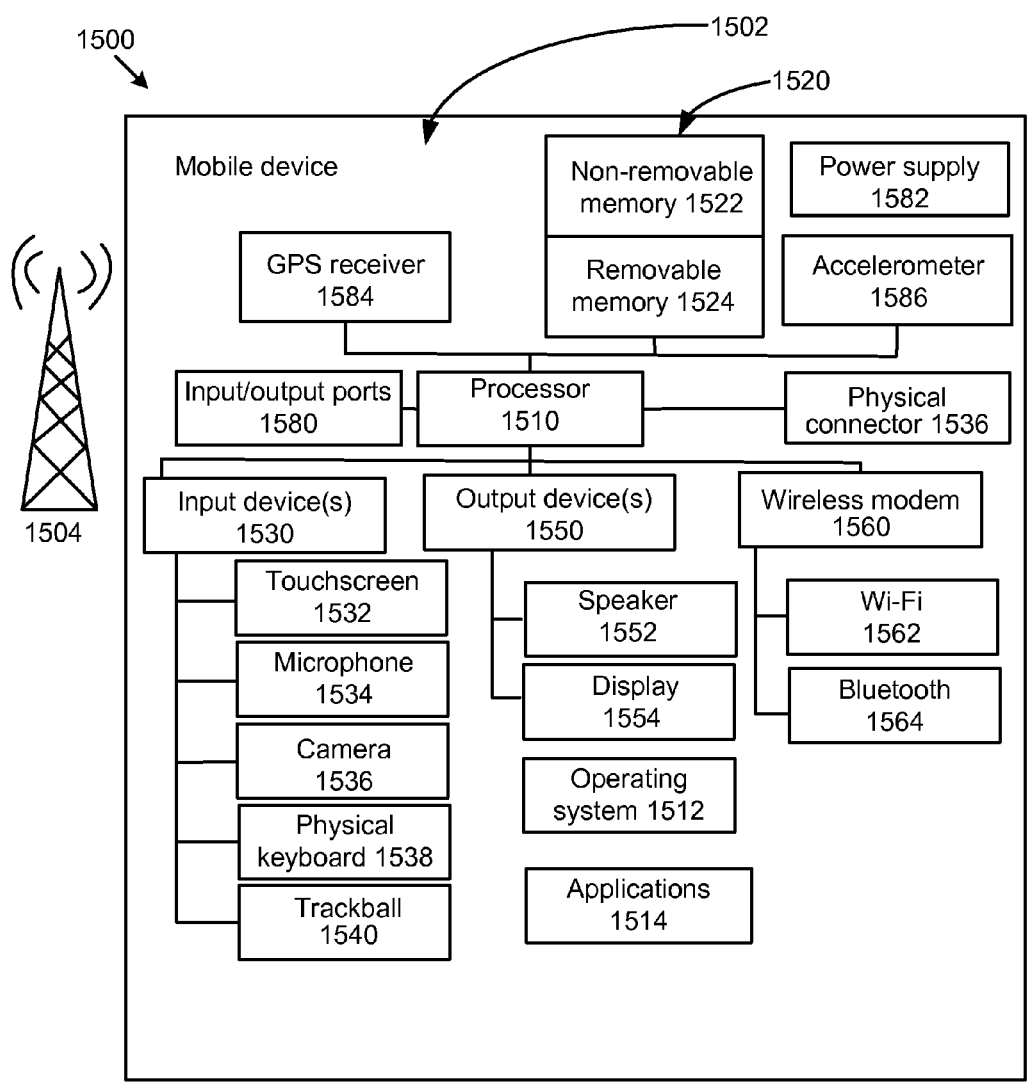
FIG. 15 illustrates a generalized example of a mobile computing device in which one or more described embodiments may be implemented.

FIG. 15 is a system diagram depicting an exemplary mobile device 1500 including a variety of optional hardware and software components, shown generally at 1502. Any components 1502 in the mobile device can communicate with any other component, although not all connections are shown, for ease of illustration. The mobile device can be any of a variety of computing devices (e.g., cell phone, smartphone, handheld computer, personal digital assistant (PDA), etc.) and can allow wireless two-way communications with one or more mobile communications networks 1504, such as a cellular or satellite network.

The illustrated mobile device can include a controller or processor 1510 (e.g., signal processor, microprocessor, ASIC, or other control and processing logic circuitry) for performing such tasks as signal coding, data processing, input/output processing, power control, and/or other functions. An operating system 1512 can control the allocation and usage of the components 1502 and support for one or more application programs 1514. The application programs can include common mobile computing applications (e.g., include email applications, calendars, contact managers, web browsers, messaging applications), or any other computing application. The mobile computing applications can further include an application for performing any of the disclosed techniques.

The illustrated mobile device can include memory 1520. Memory 1520 can include non-removable memory 1522 and/or removable memory 1524. The non-removable memory 1522 can include RAM, ROM, flash memory, a disk drive, or other well-known non-transitory storage technologies. The removable memory 1524 can include flash memory or a Subscriber Identity Module (SIM) card, which is well known in GSM communication systems, or other well-known non-transitory storage technologies, such as smart cards. The memory 1520 can be used for storing data and/or code for running the operating system 1512 and the application programs 1514, including an application program for performing any of the disclosed techniques. Example data can include web pages, text, images, sound files, video data, or other data sets to be sent to and/or received from one or more network servers or other mobile devices via one or more wired or wireless networks. The memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1530, such as a touchscreen 1532, microphone 1534, camera 1536, physical keyboard 1538 and/or trackball 1540 and one or more output devices 1550, such as a speaker 1552 and a display device 1554. Other possible output devices (not shown) can include a piezoelectric or other haptic output device. Some devices can serve more than one input/output function. For example, touchscreen 1532 and display 1554 can be combined in a single input/output device.

Touchscreen 1532 can accept input in different ways. For example, capacitive touchscreens can detect touch input when an object (e.g., a fingertip) distorts or interrupts an electrical current running across the surface. As another example, resistive touchscreens can detect touch input when a pressure from an object (e.g., a fingertip or stylus) causes a compression of the physical surface. As another example, touchscreens can use optical sensors to detect touch input when beams from the optical sensors are interrupted. Physical contact with the surface of the screen is not necessary for input to be detected by some touchscreens.

A wireless modem 1560 can be coupled to an antenna (not shown) and can support two-way communications between the processor 1510 and external devices, as is well understood in the art. The modem 1560 is shown generically and can include a cellular modem for communicating with the mobile communication network 1504 and/or other radio-based modems (e.g., Bluetooth or Wi-Fi). The wireless modem 1560 is typically configured for communication with one or more cellular networks, such as a GSM network for data and voice communications within a single cellular network, between cellular networks, or between the mobile device and a public switched telephone network (PSTN).

The mobile device can further include at least one input/output port 1580, a power supply 1582, a satellite navigation system receiver 1584, such as a global positioning system (GPS) receiver, an accelerometer 1586, a transceiver 1588 (for wirelessly transmitting analog or digital signals) and/or a physical connector 1590, which can be a USB port, IEEE 1394 (FireWire) port, and/or RS-232 port. The illustrated components 1502 are not required or all-inclusive, as components can be deleted and other components can be added.

VII. Extensions and Alternatives

Various alternatives to the implementations described herein are possible. For example, techniques described with reference to flowchart diagrams can be altered by changing the ordering of stages shown in the flowcharts, by repeating or omitting certain stages, etc. As another example, systems described with reference to system diagrams can be altered by changing the ordering of processing stages shown in the diagrams, by repeating or omitting certain stages, etc. As another example, user interfaces described with reference to diagrams can be altered by changing the content or arrangement of user interface features shown in the diagrams, by omitting certain features, etc. As another example, although some implementations are described with reference to specific devices and user input mechanisms (e.g., mobile devices with a touchscreen interface), described techniques and tools can be used with other devices and/or user input mechanisms.

Described techniques and tools can be used in different display orientations, such as portrait orientation or landscape orientation. Changes in display orientation can occur, for example, where a UI has been configured (e.g., by user preference) to be oriented in landscape fashion, or where a user has physically rotated a device. One or more sensors (e.g., an accelerometer) in the device can be used to detect when a device has been rotated, and adjust the display orientation accordingly. UI elements (e.g., a web page) can be dynamically adjusted to take into account effects of a reorientation (e.g., a new effective width of the display area, interpreting directions of user interactions differently, etc.). For example, distortion effects can be adjusted, such as by compressing UI elements in a horizontal dimension instead of a vertical dimension, to account for display reorientation. However, such adjustments are not required. For example, if a display area has equal height and width, reorientation of the display area to a landscape orientation will not change the effective width of the display area.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method comprising:
   receiving gesture information corresponding to a gesture on a touch input device, the gesture information indicating movement in at least a first dimension and a second dimension;
   based at least in part on the gesture information, calculating a new position of a viewport relative to a user interface element having an extent greater than an extent of the viewport, the user interface element having plural boundaries comprising one or more boundaries in the first dimension and one or more boundaries in the second dimension;
   determining that the new position of the viewport exceeds one or more of the plural boundaries of the user interface element; and
   in response to determining that the new position of the viewport exceeds the one or more of the plural boundaries:
      determining a region to be compressed of the user interface element; and
      calculating a multi-dimensional compression effect for the region to be compressed, wherein the multi-dimensional compression effect comprises a horizontal compression effect in which content within the region to be compressed is horizontally scaled and a vertical compression effect in which content within the region to be compressed is vertically scaled.

2. The method of claim 1 wherein calculating the multi-dimensional compression effect comprises:
   determining at least one scale factor for at least one of the horizontal or vertical scaling based at least in part on the region to be compressed and an extent by which the one or more boundaries have been exceeded, the at least one scale factor comprising a horizontal scale factor or a vertical scale factor.

3. The method of claim 2 wherein the extent by which the one or more boundaries have been exceeded is determined by comparing a value representing a current position of the viewport with one or more boundary values.

4. The method of claim 2, wherein a horizontal scaling factor and a vertical scaling factor are determined, and wherein the region to be compressed is scaled horizontally according to the horizontal scale factor and scaled vertically according to the vertical scale factor.

5. The method of claim 2 wherein calculating the multi-dimensional compression effect further comprises determining a compression point for at least one of the horizontal or vertical compression effect based at least in part on a compression offset.

6. The method of claim 5 wherein calculating the multi-dimensional compression effect further comprises scaling at least the region to be compressed according to the at least one scale factor and towards the compression point.

7. The method of claim 1 wherein the gesture information comprises a velocity, and wherein calculating the new position is based at least in part on the velocity.

8. The method of claim 1 wherein the gesture information comprises a displacement and a direction, wherein calculating the new position is based at least in part on the displacement and the direction.

9. The method of claim 1 further comprising calculating simulated inertia motion for the user interface element based at least in part on the gesture information and a drag coefficient.

10. The method of claim 9 wherein calculating the new position is based at least in part on the simulated inertia motion.

11. The method of claim 1 wherein the first dimension is a vertical dimension, and wherein the second dimension is a horizontal dimension.

12. The method of claim 1 wherein the one or more boundaries in the first dimension comprises a top boundary and a bottom boundary, and wherein the one or more boundaries in the second dimension comprise a left boundary and a right boundary.

13. The method of claim 1, further comprising:
in response to determining that the new position of the viewport exceeds the one or more of the plural boundaries:
comparing a net velocity of the viewport to a parking speed constant; and
reducing component velocities of the viewport to zero based on the comparison.

14. The method of claim 1, further comprising:
in response to determining that the new position of the viewport exceeds the one or more of the plural boundaries: generating a visually distinctive background area adjacent to a compressed area.

15. The method of claim 1 further comprising rendering the multi-dimensional compression effect for display.

16. At least one computer memory having stored thereon computer-executable instructions operable to cause a computer to perform a method comprising:
receiving gesture information corresponding to a gesture on a touch input device, the gesture information indicating movement in at least a horizontal dimension and a vertical dimension;
based at least in part on the gesture information, computing a new position of a viewport relative to a user interface element in a graphical user interface, the user interface element having a vertical movement boundary and a horizontal movement boundary;
based at least in part on the new position, determining an extent by which the vertical movement boundary has been exceeded;
determining a vertical scale factor based at least in part on the extent by which the vertical movement boundary has been exceeded;
based at least in part on the new position, determining an extent by which the horizontal movement boundary has been exceeded;
determining a horizontal scale factor based at least in part on the extent by which the horizontal movement boundary has been exceeded;
determining a region to be compressed of the graphical user interface; and
generating a multi-dimensional compression effect for the region to be compressed in the graphical user interface, wherein the multi-dimensional compression effect comprises a visual compression of content within the region to be compressed in which the content is scaled in the horizontal direction according to the horizontal scale factor and scaled in the vertical direction according to the vertical scale factor.

17. The at least one computer memory of claim 16 wherein the vertical scale factor differs from the horizontal scale factor.

18. The at least one computer memory of claim 16 wherein the vertical scale factor and the horizontal scale factor are further based on a size of the region to be compressed in the user interface element.

19. The at least one computer memory of claim 18 wherein the size of the region to be compressed is based at least in part on a size of a viewport.

20. A mobile computing device comprising one or more hardware processors, a touchscreen device, and at least one computer memory having stored therein computer-executable instructions for performing a method, the method comprising:
receiving gesture information corresponding to a gesture on the touchscreen device, the gesture information indicating a movement in at least a horizontal dimension and a vertical dimension of content in a web page in a graphical user interface; and
performing steps (a)-(i) for each of plural frames of a multi-dimensional boundary effect animation, steps (a)-(i) comprising:
(a) based at least in part on the gesture information, calculating a new vertical position of a viewport in the graphical user interface;
(b) based at least in part on the new vertical position, calculating an extent by which a vertical movement boundary associated with the web page has been exceeded;
(c) calculating a vertical scale factor based at least in part on the extent by which the vertical movement boundary has been exceeded;
(d) calculating a vertical compression effect in the web page based at least in part on the vertical scale factor, the vertical compression effect including a vertical scaling of content in the web page according to the vertical scale factor;
(e) based at least in part on the gesture information, calculating a new horizontal position of the viewport in the graphical user interface;
(f) based at least in part on the new horizontal position, calculating an extent by which a horizontal movement boundary associated with the web page has been exceeded;
(g) calculating a horizontal scale factor based at least in part on the extent by which the horizontal movement boundary has been exceeded; and
(h) calculating a horizontal compression effect in the web page based at least in part on the horizontal scale factor, the horizontal compression effect including a horizontal scaling of content in the web page according to the horizontal scale factor; and
(i) generating the horizontal compression effect and the vertical compression effect in the web page on the touchscreen device.

* * * * *